US007277921B2

(12) United States Patent
Nelson et al.

(10) Patent No.: US 7,277,921 B2
(45) Date of Patent: Oct. 2, 2007

(54) INTERPROCESS APPLICATION PROGRAMMING INTERFACE FOR COMPUTER APPLICATIONS

(75) Inventors: Timothy John Nelson, Fairfax, CA (US); Nemmara Chithambaram, Novato, CA (US); John Ricardo DeAguiar, Sebastopol, CA (US)

(73) Assignee: Autodesk, Inc., San Rafael, CA (US)

( * ) Notice: Subject to any disclaimer, the term of this patent is extended or adjusted under 35 U.S.C. 154(b) by 1312 days.

(21) Appl. No.: 09/795,719

(22) Filed: Feb. 28, 2001

(65) Prior Publication Data

US 2002/0010850 A1   Jan. 24, 2002

Related U.S. Application Data

(63) Continuation-in-part of application No. 09/629,115, filed on Jul. 31, 2000, now abandoned, and a continuation-in-part of application No. 09/628,850, filed on Jul. 31, 2000, now Pat. No. 6,674,445, and a continuation-in-part of application No. 09/628,851, filed on Jul. 31, 2000, now Pat. No. 7,142,196, and a continuation-in-part of application No. 09/629,117, filed on Jul. 31, 2000.

(60) Provisional application No. 60/193,862, filed on Mar. 30, 2000, provisional application No. 60/193,153, filed on Mar. 29, 2000, provisional application No. 60/193,142, filed on Mar. 29, 2000, provisional application No. 60/193,141, filed on Mar. 29, 2000, provisional application No. 60/159,069, filed on Oct. 12, 1999.

(51) Int. Cl.
*G06F 15/167* (2006.01)
*G06F 9/46* (2006.01)

(52) U.S. Cl. ..................... 709/213; 718/108

(58) Field of Classification Search ............... 709/200, 709/312, 204, 313, 311, 328, 329, 310, 364; 715/864; 718/108
See application file for complete search history.

(56) References Cited

U.S. PATENT DOCUMENTS

| 4,530,051 | A | * | 7/1985 | Johnson et al. ............. 709/203 |
| 5,231,584 | A | | 7/1993 | Nimura et al. |
| 5,559,707 | A | | 9/1996 | DeLorme et al. |
| 5,673,421 | A | | 9/1997 | Shirakawa |
| 5,787,300 | A | * | 7/1998 | Wijaya ......................... 712/1 |

(Continued)

OTHER PUBLICATIONS

ARGU95, Argus User's Guide 3.0, The Next Generation in GIS, Munro Garrett International, May 1994, pp. 176-180.

(Continued)

*Primary Examiner*—John Follansbee
*Assistant Examiner*—Ashok B. Patel
(74) *Attorney, Agent, or Firm*—Gates & Cooper LLP

(57) ABSTRACT

One or more embodiments of the invention provide a method, apparatus, and article of manufacture for collaborating application programs executing on a client such as a personal digital assistant (PDA). A shared database on the client is obtained and used as a common launch parameter stack. One or more program entry records are stored in the database and the last program entry record stored is identified as the top of the stack. Each program entry record may include information regarding an application launched on the client. When the last program identified on the stack has completed execution, the last program entry record is popped off of the stack. Thereafter, control is returned to an application that corresponds to the new program entry record on the top of the stack.

36 Claims, 4 Drawing Sheets

U.S. PATENT DOCUMENTS

| | | | |
|---|---|---|---|
| 5,966,135 | A | 10/1999 | Roy et al. |
| 5,973,678 | A | 10/1999 | Stewart et al. |
| 5,974,431 | A | 10/1999 | Iida |
| 6,057,854 | A | 5/2000 | Davis, Jr. et al. |
| 6,108,715 | A * | 8/2000 | Leach et al. ............... 709/330 |
| 6,205,209 | B1 * | 3/2001 | Goldberg et al. ........ 379/93.15 |
| 6,220,510 | B1 * | 4/2001 | Everett et al. .............. 235/380 |
| 2001/0050675 | A1 * | 12/2001 | O'Leary .................... 345/169 |

OTHER PUBLICATIONS

SOFT95, Specification for the Simple Vector Format (SVF) v1.1, article, SoftSource, Bellingham, Washington, 1997, pp. 1-8.

XERO95, Map Viewer Technical Details, Xerox Corporation, Jun. 2, 1995, 3 pp.

XERO95, Mapwriter (1) User Commands, Xerox Corporation Nov. 5, 1993, 4 pp.

XERO95, About the Xerox PARC Map Viewer, Xerox Corporation, Mar. 14, 1997, 7 pgs.

wabasoft, "The Waba Virtual Machine," © 1999, 2000, 2 pgs.

wabasoft, "The Waba Class Library," © 1999, 2000, 1 pg.

wabasoft, "The Waba Software Development Kit," © 1999, 2000, 2 pgs.

wabasoft, "The WARP File Format—Version 1.0," © 1999, 2000, 3 pgs.

www.wabasoft.com/faq.html, Copyright 1999, 2000, 7 pp.

www.waba.io, Class Catalog, Jan. 2001, 6 pp.

* cited by examiner

INTERPROCESS APPLICATION PROGRAMMING INTERFACE FOR COMPUTER APPLICATIONS

CROSS-REFERENCE TO RELATED APPLICATIONS

This application claims the benefit under 35 U.S.C. §119(e) of the following co-pending and commonly assigned U.S. Provisional patent applications, which applications are incorporated by reference herein:

U.S. application Ser. No. 60/193,142, entitled "INTERPROCESS API AND GRAPHICAL USER INTERFACE FOR PERSONAL DIGITAL ASSISTANT (PDA) DEVICES AND APPLICATIONS," filed on Mar. 29, 2000, by Nemmara Chithambaram, et. al., U.S. application Ser. No. 60/193,141, entided "SHARABLE SERVER UPLOADABLE REDLINING FOR PERSONAL DIGITAL ASSISTANT (PDA)," filed on Mar. 29, 2000, by Nemnmara Chithambaram, et. al.;

U.S. application Ser. No. 60/193,153 entitled "INDEXED RASTER VECTOR SCHEMA FOR PERSONAL DIGITAL ASSISTANT (PDA) DATABASES," filed on Mar. 29, 2000, by Nemmara Chithambaram, et. al.; and U.S. application Ser. No. 60/193,862, entitled "MAPGUIDE FOR MOBILE DEVICES SERVER," filed on Mar. 30, 2000, by Nemmata Chithambaram, et. al., This application claims the benefit under 35 U.S.C. §120 and 35 U.S.C. §363 of the following co-pending and commonly assigned international patent application number PCT/USOO/26436, entitled "GEOGRAPHIC MAPS ON A PERSONAL DIGITAL ASSISTANT (PDA) AND SERVER, filed on Sep. 26, 2000, which application claims the benefit under 35 U.S.C. §119(e) of U.S. application Ser. No. 60/159,069, entitled "MAPGUIDE PERSONAL DIGITAL ASSISTANT," filed on Oct. 12, 1999, by Nemmata Chithambaram, et. al; U.S. application Ser. No. 60/193,141, entitled "SHARABLE SERVER UPLOADABLE REDLINING FOR PERSONAL DIGITAL ASSISTANT (PDA) MAPS," filed on Mar. 29, 2000, by Nemmara Chithambaram, et. al; U.S. application Ser. No. 60/193,153 entitled "INDEXED RASTER VECTOR SCHEMA FOR PERSONAL DIGITAL ASSISTANT (PDA) DATABASES," filed on Mar. 29, 2000, by Nemmara Chithambaram, et. al., U.S. application Ser. No. 60/193,142, entitled "INTERPROCESS API AND GRAPHICAL USER INTERFACE FOR PERSONAL DIGITAL ASSISTANT (PDA) DEVICES AND APPLICATIONS," filed on Mar. 29, 2000, by Nemmara Chithambaram, et. al., and U.S. application Ser. No. 60/193,862, entitled "MAPGUIDE FOR MOBILE DEVICES SERVER," filed on Mar. 30, 2000, by Nemmara Chithambaram, et. al.; and which international application is a continuation in part of U.S. patent application Ser. No. 09/629,115, now ababdoned, entitled "METHOD AND APPARATUS FOR PROVIDING ACCESS TO MAPS ON A PERSONAL DIGITAL ASSISTANT (PDA)", by Nemmara Chithambaram et al., filed on Jul. 31, 2000, U.S. patent application Ser. No. 09/628,851, now U.S. Pat. No. 6,674,445, entitled "GEOGRAPHICAL DATA MARKUP ON A PERSONAL DIGITAL ASSISTANT (PDA)", by Edward J. Connor, et al., filed on Jul. 31, 2000; U.S. patent application Ser. No. 09/628,850, now U.S. Pat. No. 7,142,196, entitled "GENERALIZED, DIFFERENTIALLY ENCODED, INDEXED RASTER VECTOR DATA AND SCHEMA FOR MAPS ON A PERSONAL DIGITAL ASSISTANT", by Nemmara Chithambaram et al., filed on Jul. 31, 2000; and U.S. patent application Ser. No. 09/629,117, entitled "METHOD AND APPARATUS FOR OBTAINING A SET OF MAPS", by Howard Marantz et al., filed on Jul. 31, 2000.

This application is also a continuation-in-part of the following co-pending and commonly assigned United States Patent Applications, which are incorporated by reference herein:

U.S. patent application Ser. No. 09/629,115, now abandoned, entitled "METHOD AND APPARATUS FOR PROVIDING ACCESS TO MAPS ON A PERSONAL DIGITAL ASSISTANT (PDA)", by Nemmara Chithambaram et al., filed on Jul. 31, 2000 which application claims the benefit of U.S. application Ser. No. 60/159,069, entitled "MAPGUIDE PERSONAL DIGITAL ASSISTANT," filed on Oct. 12, 1999, by Nemmara Chithambaram, et. al., U.S. application Ser. No. 60/193,141, entitled "SHARABLE SERVER UPLOADABLE REDLINING FOR PERSONAL DIGITAL ASSISTANT (PDA)," filed on Mar. 29, 2000, by Nemmara Chithambaram, et. al.; U.S. application Ser. No. 60/193,153 entitled "INDEXED RASTER VECTOR SCHEMA FOR PERSONAL DIGITAL ASSISTANT (PDA) DATABASES," filed on Mar. 29, 2000, by Nemmara Chithambatam, et. al.; U.S. application Ser. No. 60/193,142, entitled "INTERPROCESS API AND GRAPHICAL USER INTERFACE FOR PERSONAL DIGITAL ASSISTANT (PDA) DEVICES AND APPLICATIONS," filed on Mar. 29, 2000, by Nemmata Chithambaram, et. al., and U.S. application Ser. No. 60/193,862, entitled "MAPGUIDE FOR MOBILE DEVICES SERVER," filed on Mar. 30, 2000, by Nemmata Chithambaram, et. al.;

U.S. patent application Ser. No. 09/628,850, now U.S. Pat. No. 6,674,445, entitled "GENERALIZED, DIFFERENTIALLY ENCODED, INDEXED RASTER VECTOR DATA AND SCHEMA FOR MAPS ON A PERSONAL DIGITAL ASSISTANT", by Nemmara Chithambaram et al., filed on Jul. 31, 2000, which application claims the benefit of U.S. application Ser. No. 60/159,069, entitled "MAPGUIDE PERSONAL DIGITAL ASSISTANT," filed on Oct. 12, 1999, by Nemmara Chithambatam, et. al., U.S. application Ser. No. 60/193,141, entitled "SHARABLE SERVER UPLOADABLE REDLINING FOR PERSONAL DIGITAL ASSISTANT (PDA)," filed on Mar. 29, 2000, by Nemmara Chithambaram, et. al.; U.S. application Ser. No. 60/193,153 entitled "INDEXED RASTER VECTOR SCHEMA FOR PERSONAL DIGITAL ASSISTANT (PDA) DATABASES," filed on Mar. 29, 2000, by Nemmara Chithambaram, et. al., U.S. application Ser. No. 60/193,142, entitled "INTERPROCESS API AND GRAPHICAL USER INTERFACE FOR PERSONAL DIGITAL ASSISTANT (PDA) DEVICES AND APPLICATIONS," filed on Mar. 29, 2000, by Nemmara Chithambaram, et. al., and U.S. application Ser. No. 60/193,862, entitled "MAPGUIDE FOR MOBILE DEVICES SERVER," filed on Mar. 30, 2000, by Nemmara Chithambaram, et. al.;

U.S. patent application Ser. No. 09/628,851, now U.S. Pat. No. 7,142,196, entitled "GEOGRAPHICAL DATA MARKUP ON A PERSONAL DIGITAL ASSISTANT (PDA)", by Edward J. Connor, et al., filed on Jul. 31, 2000 which application claims the benefit of U.S. application Ser. No. 60/159,069, entitled "MAPGUIDE PERSONAL DIGITAL ASSISTANT," filed on Oct. 12, 1999, by Nemmara Chithambaram, et. al., U.S. application Ser. No. 60/193,141, entitled "SHARABLE SERVER UPLOADABLE REDLINING FOR PERSONAL DIGITAL ASSISTANT (PDA)," filed on Mar. 29, 2000, by Nemmara Chithambatam, et. al., U.S. application Ser. No. 60/193,153 entitled "INDEXED RASTER VECTOR SCHEMA FOR PERSONAL DIGITAL ASSISTANT (PDA) DATABASES," filed on Mar. 29, 2000, by Nemmara Chithambaram, et. al.; and U.S. application Ser. No. 60/193,142, entitled "INTERPROCESS API AND GRAPHICAL USER INTERFACE FOR PERSONAL DIGITAL ASSISTANT (PDA) DEVICES AND APPLICATIONS," filed on Mar. 29, 2000, by Nemmara Chithambaram, et. al., and U.S. application Ser. No. 60/193,862, entitled "MAPGUIDE FOR MOBILE DEVICES SERVER," filed on Mar. 30, 2000, by Nemmara Chithambaram, et. al; and U.S. patent application Ser. No. 09/629,117, entitled "METHOD AND APPARATUS FOR OBTAINING A SET OF MAPS", by Nemmara Chithambaram et al., filed on Jul. 31, 2000, which application claims the benefit of U.S. application Ser. No. 60/159,069, entitled "MAPGUIDE PERSONAL DIGITAL ASSISTANT," filed on Oct. 12, 1999, by Nemmara Chithambaram, et. al., U.S. application Ser. No. 60/193,141, entitled "SHARABLE SERVER UPLOADABLE REDLINING FOR PERSONAL DIGITAL ASSISTANT (PDA)," filed on Mar. 29, 2000, by Nemmara Chithambaram, et. al., U.S. application Ser. No. 60/193,153 entitled "INDEXED RASTER VECTOR SCHEMA FOR PERSONAL DIGITAL ASSISTANT (PDA) DATABASES," filed on Mar. 29, 2000, by Nemmara Chithambaram, et. al., U.S. application Ser. No. 60/193,142, entitled "INTERPROCESS API AND GRAPHICAL USER INTERFACE FOR PERSONAL DIGITAL ASSISTANT (PDA) DEVICES AND APPLICATIONS," filed on Mar. 29, 2000, by Nemmara Chithambaram, et. al., and U.S. application Ser. No. 60/193,862, entitled "MAPGUIDE FOR MOBILE DEVICES SERVER," filed on Mar. 30, 2000, by Nemmara Chithambaram, et. al.

This application is related to the following co-pending and commonly-assigned patent applications, which applications are incorporated by reference herein:

U.S. patent application Ser. No. 09/411,506, now U.S. Pat. No. 6,337,693, entitled "VECTOR-BASED GEOGRAPHIC DATA", by Gregory A. Roy, et. al., filed on Oct. 4, 1999, which is a continuation patent application of U.S. Pat. No. 5,966,135 issued on Oct. 12, 1999 (application Ser. No. 08/757,706 filed on Oct. 30, 1996), by Gregory A. Roy et al., entitled "VECTOR-BASED GEOGRAPHIC DATA"; and U.S. application Ser. No. 09/795,890, now U.S. Pat. No. 7,142,205, entitled "SINGLE GESTURE MAP NAVIGATION GRAPHICAL USER INTERFACE FOR A PERSONAL DIGITAL ASSISTANT," filed on the same date herewith, by Nemmara Chithambaram, et. al.

BACKGROUND OF THE INVENTION

1. Field of the Invention

The present invention relates generally to computers and personal digital assistants (PDAs), and in particular, to a method, apparatus, and article of manufacture for collaborating between application programs executing on a computer or PDA.

2. Description of the Related Art

Prior art handheld computing devices (also referred to as palm PCs or personal digital assistants (PDAs)), are often used to access and utilize personal information. Many handheld computing devices are available in today's marketplace. Typically, handheld computing devices are only slightly larger than the size of one's palm (hence, the name palm PC) and have a small display screen for viewing a plethora of items. Software can be installed on a PDA to provide enhanced functionality. For example, a personal productivity tool may be installed to provide access to a calendar, contacts, email, Internet browsing, audio books, and audio recording capabilities. Card slots may also be available to provide additional memory or other functions (e.g., a modem). Additionally, some PDAs have infrared (IR) potts for communication.

Applications executing on a PDA may utilize and work with itself (by calling or launching a second instance of itself) or other applications on the PDA. For example, an information contact application that provides contact information for businesses and individuals may collaborate and work with a delivery application that transmits email or a fax to a listed contact using a wireless modem. In another application, a geographic information system (GIS) that provides for the retrieval and display of geographic information (e.g., maps) may call itself or collaborate with an Internet application (e.g., an application utilized to browse the Internet such as AvantGo™) to retrieve updated geographic information.

In the prior art, application collaboration on a PDA was not possible. For example, Waba (a programming platform that may include a language, virtual machine, class file format, and set of base classes) has no way to call outside itself, nor a way to remember the context it was in when returning from calling an application. Further, on a PDA, two instances of the same application may not be executed in parallel. Additionally, the use of a database to collaborate applications on a desktop workstation or computer was not performed.

SUMMARY OF THE INVENTION

One or more embodiments of the invention provide an application launch parameter stack for collaborating applications on a personal digital assistant (PDA) or computer. When a first application (referred to as a caller application) desires to call a second application (referred to as the called application), the caller application pushes two program entry records onto a stack stored in a database of the PDA or computer. The first program entry record provides state/context information for when the caller application returns. The second program entry record provides launch information for the called application.

When the called application is launched, it checks the stack, reads the necessary parameters, if any, and executes. Upon completing execution, the called application pops its own program entry record off of the stack, adjusts the stack pointer, appends any return values to the caller application's program entry record, launches the caller application, and terminates itself. The caller application reads the program entry record, restores its state, uses any return values, if necessary, pops its program entry record, and continues execution.

Accordingly, the stack allows an application running on the PDA or computer to call another application and pass context parameters. Further, the stack allows a called application to complete execution and return control to the original caller application. Thus, the state of the calling application is preserved and may be restored. Additionally, error conditions that may result from the improper termination of an application may be handled by examining and utilizing the stack.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

General Architecture

Hardware Environment

Figure 1:
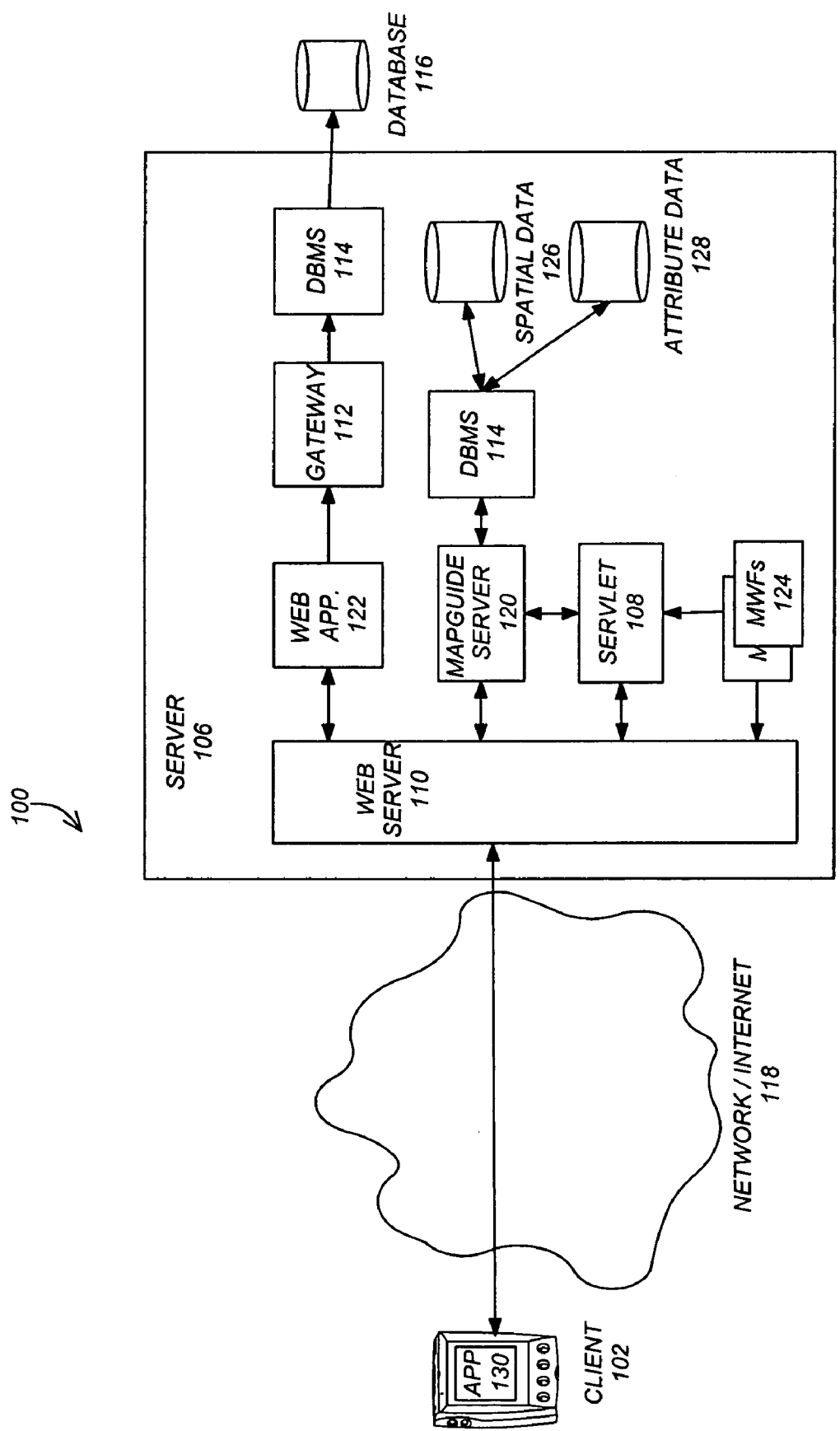
FIG. 1 schematically illustrates a hardware and software environment for the architecture in accordance with one or more embodiments of the invention.

Collaboration between applications executing on a PDA or computer is provided. FIG. 1 schematically illustrates a hardware and software environment for the architecture in accordance with one or more embodiments of the invention. A typical distributed computer system 100 uses a network/Internet 118 to connect technicians utilizing PDA clients 102 (e.g. a WINCE or PALM device) or desktop clients (e.g., a computer system running a browser) to server computers 106.

A PDA client includes three classes of devices: handheld personal computers (HPC), palm-held personal computers (PPC or PDA), and smart phones. However, embodiments of the invention may be implemented on desktop clients as well. Hereafter, PDA clients 102 and desktop clients may be used interchangeably and refer to all types of clients/client computer systems. A typical combination of resources used in system 100 may include a network/Internet 118 comprising the Internet, LANs, WANs, SNA networks, or the like, PDA clients 102, desktop clients, and servers 106 that are personal computers, workstations, minicomputers, or mainframes.

The network/Internet 118 connects PDA clients 102 or desktop clients executing the appropriate software applications 130 to server computers 106. Server computers 106 may execute a variety of applications including a Web server 110, MapGuide server 120, or servlet 108. MagGuide servers 120 and servlets 108 may be located within or part of Web server 110. The server 106 and its components may also be referred to as a back office system. Such a back office system maintains access to corporate databases, synchronization utilities, etc. The Web server 110 is typically a program such as a UNIX Apache Web server or Microsoft's Internet Information Server. The servlet 108 may communicate with a client 102 through Web server 110 such that any additional processing required by a client 102 may be performed by the servlet 108. In a GIS system, servlet 108 may communicate with MapGuide server 120 to obtain needed map data/information. Additionally, servlet 108 may access map windows files (MWF) 124 to obtain relevant data. The servers 106 may also execute a Common Gateway Interface (CGI) 112 (or Netscape Application Programming Interface (NSAPI), Internet Server Application Programming Interface (ISAPI), etc.), which interfaces between the Web server 110 and a database management system (DBMS) 114 that may be utilized to retrieve relevant geographical data (such as SDF data, raster data, Open Data-Base Connectivity (ODBC) data, etc.) from database 116.

Generally, components 108-116 and 120-130 all comprise logic and/or data that is embodied in or retrievable from a device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Software Embodiments

The user of a client 102 such as a PDA may execute one or mote applications 130. The architecture of the invention accommodates various PDA clients 102 such as Palm OS devices, WINDOWS CE 2.x devices, and/or smart phones with bitmapped graphics (e.g., SYMBIAN, MOTOROLA, NOKIA, PSION). Further, the architecture of the invention may accommodate desktop or other clients.

To enable collaboration between applications 130 executing on a client 102, an inter-application application programming interface (API) may be provided. The API provides various functions that may be utilized to control the execution of applications on the client 102. Application 130 collaboration is achieved using a client 102 local database and application launching codes. The client 102 database is utilized as a common state stack for applications 130 collaborating. There may be exceptions for applications that do not share the common state stack. Further, one objective may be to minimize the number of interprocess application programming interfaces utilized by varying applications.

A variety of mechanisms may be used to represent the database as a stack. For example, in the Palm Operating System, a catalog database is used. In a WinCE device, such a catalog may be emulated on a WinCE database. To allow applications on the client 102 to be called with parameters from Waba or other applications, a call stack in a client 102 database (e.g., a Palm catalog database) file is implemented. All cooperating applications read from and write to this single stack database.

The stack allows an application to call another application (and pass context parameters), preserves and restores the state of the original (calling application), handles error conditions that may result from the improper termination of an application, and allows the other application to complete execution and return control to the original application.

The stack records information about the order of application calls, initialization parameters to be used by the called application, and the state (or context) for the calling application.

Stack Structure

The stack structure may include a first record that contains a number and one or more additional records that contain program entries. The first record in the database contains a stack pointer which may comprise the number of entries in the stack (written as a byte, for example). This value can be used to help validate the stack. For example, the value of the first record may always be one less than the count of records in the stack, so it can be used to validate the number of entries in the stack.

Each record after the first record represents a program entry. The program entries may alternate between launch parameters used for returning to the calling program and launch parameters for the called program.

The last record containing a valid value is referred to as the top-of-the-stack. A program entry may contain information about a program launched on the client 102. For example, Table 1 illustrates the information that may be contained in a program entry record.

TABLE 1

| PRO-GRAM NAME | <TAB> | OPTIONAL PARAMETERS | <TAB> | OPTIONAL LAUNCH NUMBER | <TAB> | LAUNCH PARAMETERS |
|---|---|---|---|---|---|---|

As indicated in Table 1, the program entry record may contain the name of the launched program, followed by a TAB delimiter (to support application names containing spaces), optional parameters to the program for Win CE or nothing on Palm OS, another TAB delimiter, an optional launch number for Palm OS or nothing on WinCE, another TAB delimiter, and finally followed by its launch parameters in a string UTF (universal transformation format) format (the string UTF format allows language independence). The launch parameters may also be in the CGI (common gateway interface) format (e.g., command?parameter=value&parameter=value). The strings may not be URL encoded. Further, there may be no limit to the depth of the stack. Alternatively, the stack may have a depth limitation implied that is based on the number of bytes or size of the stack count record.

Table 2 summarizes the format of a program entry record for each platform.

TABLE 2

| Field | WinCE | PalmOS |
|---|---|---|
| Program name | YES | YES |
| TAB | YES | YES |
| Parameters to above program. For example, launching Waba with special stack, etc. | Optional | NO |
| TAB | YES | YES |
| Launch Number | NO | Optional |
| TAB | YES | YES |
| Launch parameters | Optional | Optional |

For example, an instance of the stack (with 2 program entries) is illustrated in Table 3.

TABLE 3

2

OnSite<TAB><TAB><TAB>goToMapSet?Mapset=AAAA&Map=3&displayCenterX=100&displayCenterY=100
AvantGo<TAB><TAB><TAB>AdsetUrl?URL=http://foo.com&OtherParam=5&AnotherParam=Y In Table 3, the first record contains the number 2 for the two program entry records in the stack. The first program entry contains the program name "OnSite" followed by a <TAB> delimiter, no optional parameters, a second <TAB> delimiter, no optional launch number, a third <TAB> delimiter, and launch parameters in a CGI format. The launch parameters provide a command "goToMapSet" followed by parameters and their values—Mapset with a value of AAAA, Map with a value of 3, displayCenterX with a value of 100, and displayCenterY with a value of 100.

Similarly, the second program entry record contains the program name "AvantGo" followed by a <TAB> delimiter, no optional parameters, a second <TAB> delimiter, no optional launch number, a third <TAB> delimiter, and launch parameters in a CGI format. The launch parameters provide a command ADsetUrl followed by various parameters and values—a URL parameter with a value of http://foo.com, an OtherParam parameter with a value of 5, and an AnotherParam parameter with a value of Y.

Stack Operation

The stack is most often utilized when an application (referred to as a "caller" application) desires to call or execute another application (referred to as a "called" application). When the caller intends to launch the called application with a parameter list, the caller application pushes two program entries onto the stack. First, the caller application pushes the program entry that the called application will use to return to the caller. Then, the caller application pushes the program entry that will be used by the called application. As a side effect of the two pushes, an application is able to tell whether it is being called or returned. For example, if the number of entries in the stack is even, then the application is being called. If the number of entries in the stack is odd, then the program is returning from a call.

If an error code or other return values are returned by the called application, then these values may be appended into the calling program's return parameter record as name/value pairs. For example: ¶m1=value&param2=value&Return=OK.

Thus, the following describes an overview of the stack operation. While the caller application is running, the stack may be empty. When the caller application desires to execute the called application, the caller application pushes its own state information onto the stack and then pushes information onto the stack for the called application. The called application uses the information on the stack to execute. Upon completing its execution, the called application may append return values onto the caller application's program entry record and then pops its own information off of the stack and returns control to the caller application. The caller application may utilize any return values provided by the called application and then pops its information off of the stack to continue its execution.

Figure 2:
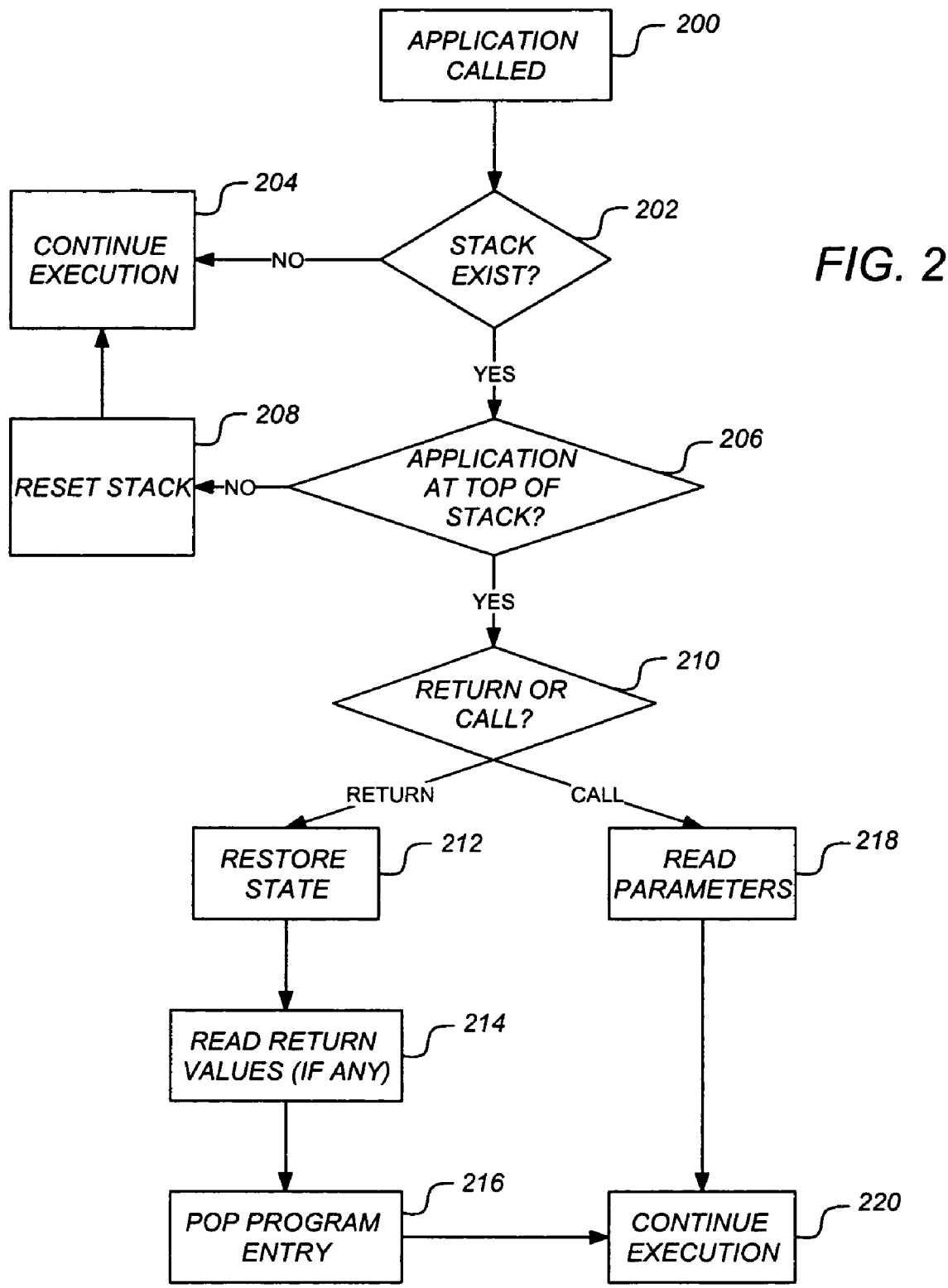
FIG. 2 is a flow chart illustrating the actions upon the launch of an application/program in accordance with one or more embodiments of the invention.

FIG. 2 is a flow chart illustrating the actions upon the launch of an application/program in accordance with one or more embodiments of the invention. At step 200, the application is called. At step 202, the application determines if a stack exists. If a stack does not exist, execution continues at step 204. However, if a stack does exist, the application determines if it is at the top of the stack at step 206. If the called/launched application is not at the top of the stack, then the stack is invalid, has been corrupted, or an error has occurred. Accordingly, the stack is reset at step 208 and the application continues execution at step 204. Such continued execution may result pursuant to a default mode that permits such execution. The stack may be reset by completely deleting the stack or by removing all of the program entry records in the stack.

If the top of the call-stack contains the program name of the currently running program, the program should attempt to run given the parameters on this program entry. In attempting to run, the application determines if it is being returned to by an application it has called (i.e., whether it is the caller application), or if it is being called by another application or being launched (i.e., whether it is the called application) at step 210. As described above, to determine whether it is being called or returned to, the application may merely determine whether there are an even number of entries or odd number of entries on the stack. Since two entries are pushed onto the stack every time an application is called, if the application is being called, there are an even number of entries. Similarly, when an application has completed execution and is returning control to the caller application, the called application pops its entry off the stack, leaving an odd number of stack records. Thus, if the application is being returned, there are an odd number of entries on the stack.

If the application is being returned, the application restores its state by examining its program entry record at step 212. At step 214, the application reads any return values appended in the program entry record. The application then continues execution at step 220. If the application is being launched/called, it reads the parameters from the program entry record at step 218, and continues execution at step 220.

Thus, upon program startup, the application reads the application launch parameter stack to determine how to proceed.

Figure 3:
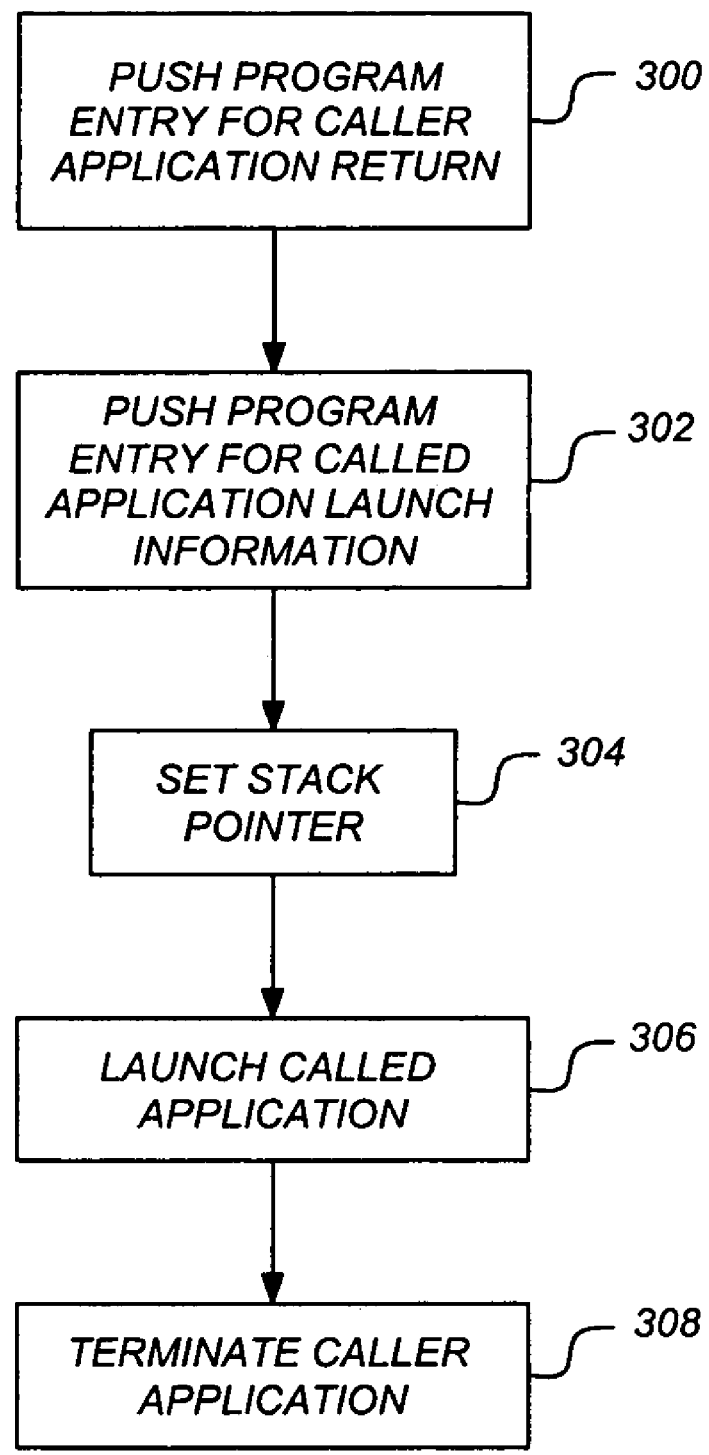
FIG. 3 is a flow chart illustrating the use of a stack and how a caller program calls a called program in accordance with one or more embodiments of the invention.

FIG. 3 is a flow chart illustrating the use of a stack and how a caller program calls a called program in accordance with one or more embodiments of the invention. At step 300, the caller application pushes a program entry record for the caller application return onto the stack. Thus, the state information for the caller application that allows the caller application to restore its state upon returning is pushed onto the stack. At step 302, the caller application pushes a program entry record for the called application launch information onto the stack. The pushed information can then be used (as indicated in step 218 of FIG. 2) for the launched application to properly execute. At step 304, the stack pointer is adjusted to point to the top of the stack. Thus, if the stack pointer is a pointer, it points to the called application program entry. Similarly, if the stack pointer is a number that reflects the number of entries in the stack, the number may be increased by two (2) to accommodate the two recent program entry record additions performed at steps 300 and 302.

At step 306, top of the stack program entry (i.e., the called application) is launched/called by the caller application. At step 308, the caller application may terminate itself. On the Palm OS, the caller application termination may automatically result when the called application is launched. On the Windows CE, the caller application may have to terminate itself.

Figure 4:
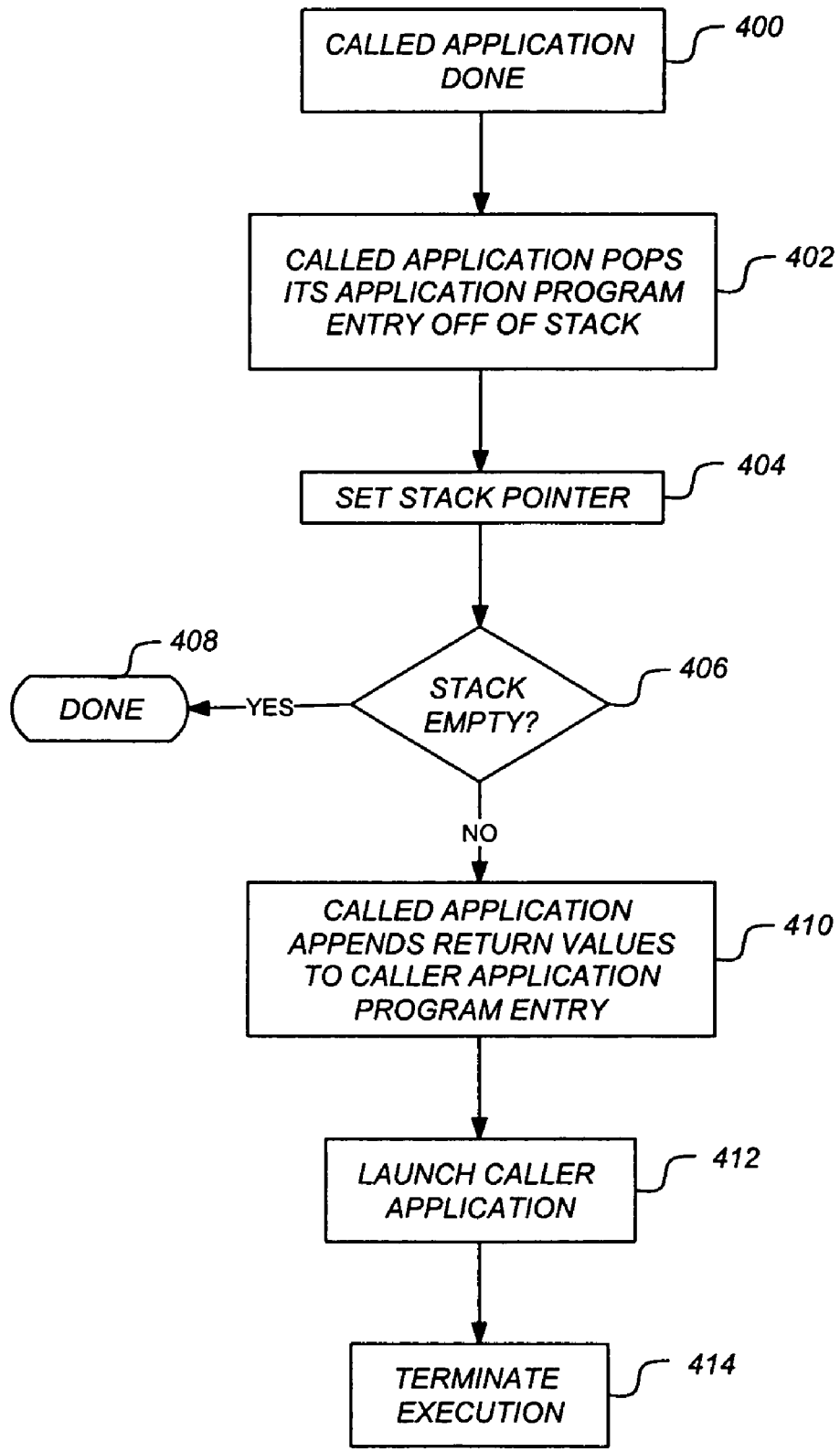
FIG. 4 is a flow chart illustrating the actions taken when a called application has completed executing in accordance with one or more embodiments of the invention.

FIG. 4 is a flow chart illustrating the actions taken when a called application has completed executing in accordance with one or mote embodiments of the invention. To complete execution, a "Done" button or completion operation may be selected by a user. Alternatively, application execution may terminate without user interaction. Under either scenario, a script may execute for proper stack operation. At step 400, the called application has completed executing. At step 402, the called application pops its application program entry off of the stack. At step 404, the called application adjusts the stack pointer as necessary (e.g., to point to the prior record in the stack). At step 406, a determination is made regarding whether the stack is now empty. If the stack is empty (i.e., there are no other applications to execute), the operations are complete and no further action may be necessary at step 408.

If the stack is not empty, the called application appends any return values to the caller application's program entry record at step 410. At step 412, the called application launches the caller application. The called application then terminates execution at step 414. Thereafter, operations proceed as described in FIG. 2.

Accordingly, FIGS. 2-4 describe the stack operation in accordance with one or more embodiments of the invention.

To more fully understand the stack operation, it is useful to describe some examples. The examples below show only a single level of calling; however, cooperating applications may be chained together arbitrarily.

The following example describes the operations for calling the AvantGo application (a Mobile Application Linking (MAL)-compliant application). When AvantGo is called, if the stack database does not exist, the program should come up as it normally does. If the stack database exists, it should ensure that the top of the stack contains AvantGo for the program entry. If the top of the stack contains AvantGo for the program entry, then it should display the URL described in the program entry parameters. However, if the top of the stack does NOT contain AvantGo (error condition), AvantGo may reset the stack by deleting the catalog database, and come up as it normally does (the "done" action will exit the AvantGo). For example, AvantGo may go to a URL (http://foo.com) given the following stack:

| 2 |
|---|
| OnSite<TAB><TAB><TAB>goToMapSet?Mapset=AAAA&Map=3& displayCenterX=100&displayCenterY=100 |
| AvantGo<TAB><TAB><TAB>AdsetUrl?URL=http://foo.com&OtherParam=5&AnotherParam=Y |

The number 2 refers to the record number starting from 0 of the current stack element. The number 2 is then followed by two records each containing "program parameters".

Upon AvantGo completing execution (e.g., when a "Done" action is executed), the last record in the stack database (i.e., the program entry for AvantGo) is popped. The count entry in record 0 is then decremented by one (in step 404 of FIG. 4). If a return value or values are needed (a return may be optional), AvantGo appends them to the record at the top of stack in the form:

"&Return=OK&param1=value&param2=value" (at step 410 of FIG. 4). The current last program entry (in this case OnSite) is then executed (at step 412 of FIG. 4) and execution of AvantGo is terminated (at step 414 of FIG. 4) (on the Palm OS, this may happen automatically when the last program entry is executed. Once the above actions have been completed, the stack would look as follows:

| | 1 |
|---|---|
| | OnSite<TAB><TAB><TAB>goToMapSet?Mapset=AAA A&Map=3&displayCenterX=100&displayCenterY=100&Return=Failure |

Any exit from a cooperating application that does not use a special "Done" button may terminate the application without attempting to return to the calling application. In such a situation, there may not be any special processing of the stack required and embodiments may not attempt to prevent such exits.

In accordance with one or more embodiments of the invention, an in-process API may be provided for 3rd party applications running inside Waba, C, or the Java environment, that extends the functionality of a GIS executing on a PDA. In this scenario, the GIS may function as a library or DLL (dynamic link library) that is linked to the extending application. This type of API may be development platform-dependant.

The AvantGo application may be configured to work with the stack as described above. When configured, the AvantGo application may implement a "setURL" function that causes an URL (specified in the stack) to be displayed immediately upon launch. Further, a special "Done" script may cause AvantGo to return control to the application that called it, when a button on an HTML page that calls the script is pressed.

In the following example, an application called "AAA" wishes to execute function "foo" in application "BBB". Initially, application "AAA" prepares to call application "BBB". As part of this preparation, application "AAA" pushes information for its own return (record 1 below), then it pushes the launch information to be used by application "BBB" (record 2 below.) Application "AAA" then sets the stack pointer (record 0 below) to "2". Just before application "BBB" is actually launched, the stack appears as follows:

| Record | Contents |
|---|---|
| 0 | 2 |
| 1 | AAA<tab>param<tab>launchNumber<tab>returnLocation?returnParam1=395&anotherReturnParam=Yes |
| 2 | BBB<tab><tab><tab>foo?someParam=3&anotherParam="A Quoted Text String"&lastParam=-12.3 |

With the stack in this state, application "AAA" launches application "BBB" and terminates itself. Upon startup, application "BBB" will check the top of the stack and determine that it is being launched to execute function "foo" with the given parameter list.

Once application "BBB" has completed executing, it prepares to return to application "AAA". Thus, when application "BBB" has completed function "foo", it pops its own parameter list off the stack. If, as in this example, a return value requires a return value, then application "BBB" must append a name/value pair string to application "AAA"'s return parameter list. In this example, the return parameter is "Return" and its value is "OK". The stack will appear as follows:

| Record | Contents |
|---|---|
| 0 | 1 |
| 1 | AAA <tab>param<tab>launchNumber<tab>returnLocation?returnParam1=395&anotherReturnParam=Yes&Return=OK |

With the stack in this state, application "BBB" launches application "AAA" and terminates itself. Upon startup, application "AAA" will check the top of the stack, see that it is being launched to return from its call to function "foo". Application "AAA" may then use the launch parameters to restore state, read the return value, and proceed accordingly.

Conclusion

This concludes the description of one or more embodiments of the invention. The following describes some alternative embodiments for accomplishing the present invention.

For example, any type of personal digital assistant or computer, such as a mainframe, minicomputer, or personal computer, or computer configuration, such as a timesharing mainframe, local area network, standalone personal computer, WINCE device, etc. could be used with the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method for collaborating applications executing on a personal digital assistant (PDA) client comprising:
   (a) obtaining a shared database on the PDA client to be used as a common stack for collaborating applications, wherein the database comprises a catalog database having one or more records;
   (b) storing one or more program entry records, as the one or more records, in the database wherein the last program entry record stored is the top of the stack, and wherein each program entry record comprises information regarding an application launched on the PDA client, wherein said information in each program entry record comprises:
      (i) state information regarding the application launched on the PDA client; and
      (ii) launch parameters for the application launched on the PDA client; and
   (c) popping the last program entry record off of the stack when a second application corresponding to the last program entry record has completed execution, wherein the popping of the last program entry record returns control to a first application corresponding to a next program entry record on the stack, wherein said next program entry record on the stack comprises launch parameters for returning to the first application.

2. The method of claim 1 further comprising storing a record number in a record in the database, wherein the record number comprises a total number of program record entries in the stack.

3. The method of claim 2 further comprising verifying the stack using the record number.

4. The method of claim 1 wherein the information for a program entry record comprises a name of an application launched on the PDA client and optional parameters for the application.

5. The method of claim 1 wherein the information for a program entry record comprises state information regarding an application launched on the PDA client, and wherein the state information may be used to restore the state of the application.

6. The method of claim 1 wherein:
a first program entry record in the database comprises information regarding the first application launched on the PDA client; and
a second program entry record in the database comprises information regarding the second application launched by the first application on the PDA client.

7. The method of claim 6 wherein the second program entry record is popped from the stack by the second application.

8. The method of claim 1 wherein popping the last program entry record further comprises storing return values, from the application that has completed execution, with the next program entry record on the stack.

9. The method of claim 1 wherein the storing of a program entry record comprises storing context parameters for the second application to be launched.

10. The method of claim 1 wherein:
two program entry records are pushed onto the stack when the second application is called by the first application; and
the first application and second application determine whether it is being called or being returned to based on whether a number of program entry records on the stack is even or odd.

11. The method of claim 1, wherein:
the first application terminates when the second application is called; and
the stack is used to return control to the first application when the second application has completed execution.

12. The method of claim 1 wherein two instances of the same application are executed in parallel using the stack for collaboration.

13. A system for collaborating applications executing on a personal digital assistant (PDA) client comprising:
(a) a personal digital assistant (PDA) client;
(b) a shared database on the PDA client that is used as a common stack for collaborating applications launched on the PDA client, wherein the database comprises a catalog database having one or more records;
(c) a program entry record, as one of the one or more records, stored in the shared database wherein a last program entry record stored in the database is the top of the stack, and wherein each program entry record comprises information regarding an application launched on the PDA client, wherein said information in each program entry record comprises:
(i) state information regarding the application launched on the PDA client; and
(ii) launch parameters for the application launched on the PDA client; and
(d) a second application launched on the PDA client, the application configured to:
(i) store the program entry record in the shared database; and
(ii) pop the last program entry record off of the stack when the second application has completed execution, wherein the popping of the last program entry record returns control to a first application corresponding to a next program entry record on the stack, wherein said next program entry record on the stack comprises launch parameters for returning to the first application.

14. The system of claim 13 further comprising a record number stored in a record in the database, wherein the record number comprises a total number of program record entries in the stack.

15. The system of claim 14 wherein the record number is used to verify the stack.

16. The system of claim 13 wherein the information for a program entry record comprises a name of an application launched on the PDA client and optional parameters for the application.

17. The system of claim 13 wherein the information for a program entry record comprises state information regarding an application launched on the PDA client, and wherein the stare information may be used to restore the state of application.

18. The system of claim 13 wherein:
a first program entry record in the database comprises information regarding the first application launched on the PDA client; and
a second program entry record in the database comprises information regarding the second application launched by the first application on the PDA client.

19. The system of claim 18 wherein the second program entry record is popped from the stack by the second application.

20. The system of claim 13 wherein the popping the last program entry record by the application further comprises storing return values, from the application that has completed execution, with the nest program entry record on the stack.

21. The system of claim 13 wherein the program entry record comprises context parameters for an application to be launched.

22. The system of claim 13 wherein:
two program entry records are pushed onto the stack when the second application is called by the first application; and
the first application and second application determine whether it is being called or being returned to based on whether a number of program entry records on the stack is even or odd.

23. The system of claim 13, wherein:
the first application terminates when the second application is called; and
the stack is used to return control to the first application when the second application has completed execution.

24. The system of claim 13 wherein two instances of the same application are executed in parallel using the stack for collaboration.

25. An article of manufacture comprising a program storage device embodying instructions that, when executed by a personal digital assistant (PDA) client, cause the PDA client to perform a method for collaborating applications executing on the PDA client, comprising:
(a) means for obtaining a shared database on the PDA client to be used as a common stack for collaborating applications, wherein the database comprises a catalog database having one or more records;
(b) means for storing one or more program entry records, as the one or more records, in the database wherein the last program entry record stored is the top of the stack, and wherein each program entry record comprises information regarding an application launched on the PDA client, wherein said information in each program entry record comprises:
  (i) state information regarding the application launched on the PDA client; and
  (ii) launch parameters for the application launched on the PDA client; and
(c) means for popping the last program entry record off of the stack when a second application corresponding to the last program entry record has completed execution, wherein the popping of the last program entry record returns control to a first application corresponding to a next program entry record on the stack, wherein said next program entry record on the stack comprises launch parameters for returning to the first application.

26. The article of manufacture of claim 25 further comprising means for storing a record number in a record in the database, wherein the record number comprises a total number of program in record entries in the stack.

27. The article of manufacture of claim 26 further comprising means for verifying the stack using the record number.

28. The article of manufacture of claim 25 wherein the information for a program entry record comprises a name of an application launched on the PDA client and optional parameters for the application.

29. The article of manufacture of claim 25 wherein the information for a program entry record comprises state information regarding an application launched on the PDA client, and wherein the state information may be used to restore the state of the application.

30. The article of manufacture of claim 25 wherein:
  a first program entry record in the database comprises information regarding the first application launched on the PDA client; and
  a second program entry record in the database comprises information regarding the second application launched by the first application on the PDA client.

31. The article of manufacture of claim 30 further comprising means for popping the second program entry record from the stack by the second application.

32. The article of manufacture of claim 25 wherein the means for popping the last program entry record further comprises means for storing return values, from the application that has completed execution, with the next program entry record on the stack.

33. The article of manufacture of claim 25 wherein the means for storing of a program entry record comprises means for storing context parameters for the second application to be launched.

34. The article of manufacture of claim 25 wherein:
  two program entry records are pushed onto the stack when the second application is called by the first application; and
  the first application and second application determine whether it is being called or being returned to based on whether a number of program entry records on the stack is even or odd.

35. The article of manufacture of claim 25, wherein:
  the first application terminates when the second application is called; and
  the stack is used to return control to the first application when the second application has completed execution.

36. The article of manufacture of claim 25 wherein two instances of the same application are executed in parallel using the stack for collaboration.

* * * * *